US008429665B2

(12) United States Patent
Zaroo et al.

(10) Patent No.: US 8,429,665 B2
(45) Date of Patent: Apr. 23, 2013

(54) CACHE PERFORMANCE PREDICTION, PARTITIONING AND SCHEDULING BASED ON CACHE PRESSURE OF THREADS

(75) Inventors: Puneet Zaroo, Santa Clara, CA (US); Richard West, Easton, MA (US); Carl A. Waldspurger, Palo Alto, CA (US); Xiao Zhang, Rochester, NY (US)

(73) Assignee: VMware, Inc., Palo Alto, CA (US)

( * ) Notice: Subject to any disclaimer, the term of this patent is extended or adjusted under 35 U.S.C. 154(b) by 659 days.

(21) Appl. No.: 12/727,705

(22) Filed: Mar. 19, 2010

(65) Prior Publication Data

US 2011/0231857 A1 Sep. 22, 2011

(51) Int. Cl.
*G06F 9/50* (2006.01)
(52) U.S. Cl.
USPC .......................................... 718/104; 718/102
(58) Field of Classification Search .................. None
See application file for complete search history.

(56) References Cited

U.S. PATENT DOCUMENTS

| | | | | |
|---|---|---|---|---|
| 6,243,788 | B1 * | 6/2001 | Franke et al. ................. | 711/3 |
| 6,374,367 | B1 * | 4/2002 | Dean et al. ..................... | 714/37 |
| 6,442,585 | B1 * | 8/2002 | Dean et al. ..................... | 718/108 |
| 7,434,002 | B1 * | 10/2008 | Zedlewski et al. ............ | 711/130 |
| 7,487,317 | B1 * | 2/2009 | Fedorova et al. ............. | 711/168 |
| 7,581,064 | B1 * | 8/2009 | Zedlewski et al. ............ | 711/118 |
| 7,689,773 | B2 * | 3/2010 | Fedorova ....................... | 711/130 |
| 7,707,578 | B1 * | 4/2010 | Zedlewski et al. ............ | 718/102 |
| 7,818,747 | B1 * | 10/2010 | Fedorova et al. ............. | 718/102 |
| 8,028,286 | B2 * | 9/2011 | Fedorova ....................... | 718/102 |
| 2004/0143707 | A1 * | 7/2004 | Olarig et al. .................. | 711/129 |
| 2007/0033592 | A1 * | 2/2007 | Roediger et al. .............. | 718/102 |
| 2008/0195849 | A1 * | 8/2008 | Gonzalez et al. ............. | 712/223 |
| 2009/0006755 | A1 * | 1/2009 | Illikkal et al. ................. | 711/126 |
| 2009/0007120 | A1 * | 1/2009 | Fenger et al. ................. | 718/102 |
| 2009/0165004 | A1 * | 6/2009 | Moses et al. .................. | 718/102 |
| 2010/0199280 | A1 * | 8/2010 | Vestal et al. .................. | 718/102 |
| 2011/0087843 | A1 * | 4/2011 | Zhao et al. .................... | 711/129 |

OTHER PUBLICATIONS

Advanced Micro Devices, Inc. (2007). AMD64 Architecture Programmer's Manual, vol. 2: System Programming.
D.H. Albonesi (Nov. 1999). "Selective Cache Ways: On-Demand Cache Resource Allocation," 32nd Annual ACM/IEEE International Symposium on Microarchitecture, p. 248-259.
J.C. Bennett and H. Zhang (Mar. 1996). "W F2Q: Worst-Case Fair Weighted Fair Queueing," IEEE INFOCOMM '96, p. 120-128.

(Continued)

*Primary Examiner* — Meng An
*Assistant Examiner* — Benjamin Wu
(74) *Attorney, Agent, or Firm* — Leonard Heyman (57) ABSTRACT

A method is described for scheduling in an intelligent manner a plurality of threads on a processor having a plurality of cores and a shared last level cache (LLC). In the method, a first and second scenario having a corresponding first and second combination of threads are identified. The cache occupancies of each of the threads for each of the scenarios are predicted. The predicted cache occupancies being a representation of an amount of the LLC that each of the threads would occupy when running with the other threads on the processor according to the particular scenario. One of the scenarios is identified that results in the least objectionable impacts on all threads, the least objectionable impacts taking into account the impact resulting from the predicted cache occupancies. Finally, a scheduling decision is made according to the one of the scenarios that results in the least objectionable impacts.

13 Claims, 6 Drawing Sheets

OTHER PUBLICATIONS

E. Berg, H. Zeffer, and E. Hagersten (2006). "A Statistical Multiprocessor Cache Model," ISPASS, p. 89-99.

J.M. Calandrino and J.H. Anderson (2008). "Cache-Aware Real-Time Scheduling on Multicore Platforms: Heuristics and a Case Study," ECRTS '08, p. 299-308.

J. Chang and G.S. Sohi (2007). "Cooperative Cache Partitioning for Chip Multiprocessors," 18th Annual International Conference on Supercomputing, p. 242-252.

S. Cho and L. Jin (2006). "Managing Distributed, Shared L2 Caches Through OS-Level Page Allocation," 39th Annual IEEE/ACM International Symposium on Microarchitecture, p. 455-468.

H. Dybdahl, P. Stenstrom, and L. Natvig (2006). "A Cache-Partitioning Aware Replacement Policy for Chip Multiprocessors," High Performance Computing (4297/2006): p. 22-34.

A. Fedorova, M. Seltzer, and M. D. Smith (2006). "Cache-Fair Thread Scheduling for Multi Core Processors," Technical Report TR-17-06, Harvard University.

J. Heinrich (1994). MIPS R4000 Microprocessor User's Manual, MIPS Technologies, Inc.

Intel Corporation (2009). Intel 64 and IA-32 Architectures Software Developer's Manual, vol. 3: System Programming Guide, Jun. 2009.

Intel Corporation (2009). "Intel Multi-Core Technology," located at <http://www.intel.com/multi-core/> visited on Jun. 9, 2010, 2 pages.

R. Iyer (2004). "CQoS: A Framework for Enabling QoS in Shared Caches of CMP Platforms," 18th Annual International Conference on Supercomputing, p. 257-266.

S. Kim, D. Chandra, and Y. Solihin (2004). "Fair Cache Sharing and Partitioning in a Chip Multiprocessor Architecture," International Conference on Parallel Architectures and Compilation Techniques.

J. Liedtke, H. Hartig, and M. Hohmuth (1997). "OS-Controlled Cache Predictability for Real-Time Systems," 3rd IEEE Real-time Technology and Applications Symposium.

J. Lin, Q. Lu, X. Ding, Z. Zhang, X. Zhang, and P. Sadayappan (2008). "Gaining Insights Into Multicore Cache Partitioning: Bridging the Gap Between Simulation and Real Systems," 14th IEEE International Symposium on High Performance Computer Architecture, p. 367-378.

C. Liu, A. Sivasubramaniam, and M. Kandemir (2004). "Organizing the Last Line of Defense Before Hitting the Memory Wall for CMPs," International Symposium on High-Performance Computer Architecture, p. 176-185.

R. L. Mattson, J. Gecsei, D. R. Slutz, and 1. L. Traiger (1970). "Evaluation Techniques for Storage Hierarchies," IBM Systems Journal, 9(2): p. 78-117.

A. Naveh, E. Rotem, A. Mendelson, S. Gochman, R. Chabukswar, K. Krishnan, and A. Kumar (2006). "Power and Thermal Management in the Intel Core Duo Processor," Intel Technology Journal, 10(2): p. 109-122.

N. Nethercote and J. Seward (2007). "Valgrind: a Framework for Heavyweight Dynamic Binary Instrumentation," ACM SIGPLAN 2007 Conference on Programming Language Design and Implementation, Jun. 2007, p. 89-100.

A. Parekh (1992). "A Generalized Processor Sharing Approach to Flow Control in Integrated Services Networks," PhD Thesis, Massachusetts Institute of Technology, Feb. 1992.

M. K. Qureshi and Y. N. Patt (2006). "Utility-Based Cache Partitioning: A Low-Overhead, High-Performance, Runtime Mechanism to Partition Shared Caches," 39th Annual IEEE/ACM International Symposium on Microarchitecture, p. 423-432.

N. Rafique, W.-T. Lim, and M. Thottethodi (2006). "Architectural Support for Operating System-Driven CMP Cache Management," 15th International Conference on Parallel Architectures and Compilation Techniques, p. 2-12.

P. Ranganathan, S. V. Adve, and N. P. Jouppi (2000). "Reconfigurable Caches and Their Application to Media Processing," 27th Annual International Symposium on Computer Architecture, p. 214-224, Jun. 2000.

T. Sherwood, B. Calder, and J. S. Emer (1999). "Reducing Cache Misses Using Hardware and Software Page Placement," International Conference on Supercomputing, Jun. 1999.

S. Srikantaiah, M. Kandemir, and M. J. Irwin (2008). "Adaptive Set Pinning: Managing Shared Caches in CMPs," ASPLOS'08, ACMIIEEE, Mar. 2008.

I. Stoica, H. Abdel-Wahab, K. Jeffay, S. K. Baruah, J. E. Gehrke, and C. G. Plaxton (1996). "A Proportional Share Resource Allocation Algorithm for Real-Time, Time-Shared Systems," Real-Time Systems Symposium. IEEE, Dec. 1996.

G. E. Suh, S. Devadas, and L. Rudolph (2001). "Analytical Cache Models with Applications to Cache Partitioning," International Conference on Supercomputing, 2001.

G. E. Suh, L. Rudolph, and S. Devadas (2004). "Dynamic Partitioning of Shared Cache Memory," Journal of Supercomputing, 28(1): p. 7-26, Apr. 2004.

D. Tam, R. Azimi, L. Soares, and M. Stumm (2009)."RapidMRC: Approximating L2 Miss Rate Curves on Commodity Systems for Online Optimizations," ASPLOS'09, Mar. 2009.

D. Tam, R. Azimi, and M. Stumm (2007). "Thread Clustering: Sharing-Aware Scheduling on SMP-CMP-SMT Multiprocessors," EurcSys, p. 47-58, Mar. 2007.

VMware, Inc. (2009). vSphere Resource Management Guide: ESX 4.0, ESXi 4.0, vCenter Server 4.0.

C. Waldspurger and W. Weihl (1994). "Lottery Scheduling: Flexible Proportional Share Resource Management," OSDI'04, p. 1-11, Nov. 1994.

C. A. Waldspurger and W. E. Weihl (1995). "Stride Scheduling: Deterministic Proportional-Share Resource Management," Technical Report MITILCSITM-528, MIT, Jun. 1995.

H. Zhang and S. Keshav (1991). "Comparison of Rate-Based Service Disciplines," ACM SIGCOMM, p. 113-121. ACM, Aug. 1991.

X. Zhang, S. Dwarkadas, and K. Shen (2009). "Hardware Execution Throttling for Multi-Core Resource Management," USENIX Annual Technical Conference, Jun. 2009.

Y. Zhang and R. West (2006). "Process-Aware Interrupt Scheduling and Accounting," 27th IEEE Real-Time Systems Symposium, Dec. 2006.

L. Zhao, R. Iyer, R. Illikkal, J. Moses, D. Newell, and S. Makineni (2007). "CacheScouts: Fine-Grain Monitoring of Shared Caches in CMP Platforms," 16th International Conference on Parallel Architectures and Compilation Techniques, Sep. 2007.

\* cited by examiner

```
01 S = N;   // initialize surplus cache lines S
02 foreach τ(i) do
03   O(i) = 0;   // initial occupancy
04 end
05 repeat
06   Pmax = 0;   // reset max pressure
07   foreach τ(i) do
08     //  pressure at current occupancy
09     P(i) = (1 - O(i)/N)·M(O(i));
10     if P(i) > Pmax then
11       // record thread with max pressure
12       Pmax = P(i);
13       max = i;
14     end
15   end
16   // greedily assume chunk of size B allocated
17   // to thread with max pressure
18   O(max) = O(max) + B
19   S = S - B;
20 until S= 0 or ∀P(i) = 0
```

CACHE PERFORMANCE PREDICTION, PARTITIONING AND SCHEDULING BASED ON CACHE PRESSURE OF THREADS

CROSS REFERENCE TO RELATED APPLICATIONS

This application has subject matter that is related to that disclosed in U.S. patent application Ser. Nos. 12/251,108, filed on Oct. 14, 2008 and 12/550,193, filed on Aug. 28, 2009, each of which is incorporated herein by reference in its entirety.

BACKGROUND

Modern symmetric microprocessor systems (SMP) incorporate multiple processor cores sharing a last-level memory cache (LLC). A cache is a high-speed data storage area adjacent the processor core for storing a copy of recently accessed or frequently accessed data that is stored in the main memory system of a computer. The term "processor core" is used herein to indicate an execution engine that may coexist with other processor cores on a single die. In modern multi-core processors, each core often has one or two levels of its own cache, and shares a second- or third-level cache (the LLC) with one or more other cores on the same die. However, there are also processors with multiple cores on separate dies that share an LLC on the main mother board or within a processor package. Having more than one core allows for more than one thread to execute simultaneously on a single computer system (and not just time-wise interleaved).

When a thread that is executing on one core of a processor fetches data, it first checks local cache to see if the data is already present in the cache. When there are multiple levels of cache, the checks percolate through to the LLC if the earlier caches do not have the requested data. If the requested data is not in the LLC (an LLC "cache miss") then the data is fetched from main memory, and a line is evicted from the LLC so that the newly-fetched data can be made available in the LLC in case it is needed again. When the LLC is shared by a plurality of processor cores, the data that was evicted was placed there by the same thread whose memory request resulted in the eviction, or by a different thread, possibly running on a different core. As a result, the execution of one thread on one core can adversely affect the execution of other threads running on the same or other cores that share the same LLC.

CPU resources are generally allocated to a plurality of concurrently running threads that may execute interleaved on a single core or simultaneously on a plurality of different cores, or both. There are many existing scheduling algorithms in use, which generally attempt to provide some "fair" distribution of processor resources to each of the executing threads. In some cases, a CPU scheduling algorithm may take into consideration a "proportional share" of the scheduling resources, such that some processes are granted a greater than even share of processor resources. In a proportional fair scheduling policy, for example, a first thread may be given a proportional share of 800, and a second thread given a proportional share of 400, so that the ratio between the two is 2:1, and the first thread is given twice the resources (i.e., CPU execution time) as the second.

Contention for LLC and other microarchitectural resources can adversely impact the fair distribution of processor resources among threads, making the distribution less fair. Microarchitecture refers to a physical implementation of an instruction set architecture in a computer system. Microarchitectural resources include the physical resources such as the cache, memory interconnects, and functional units. Contention for these resources result in delays in useful execution by one thread imposed by another thread. For example, because the execution of a first thread on a first core can interfere with data stored in the LLC that is shared with a second thread, and because a cache miss imparts a significant penalty in terms of the time it takes to fetch the data from the main memory, the presence of a shared LLC can result in delays in execution to the second thread caused by the first thread.

Further complexity is added to scheduling decisions when a computer has multiple processor "sockets" or "dies." (The term, "die" or "chip" refers to a single, typically silicon-based integrated circuit, whereas "processor" generally refers to a processor package that is typically removably mounted to a "socket" on a computer motherboard, such that there is a one-to-one relationship between processors and sockets, although a single package can contain multiple dies or chips.) Herein, the term "processor" or "central processing unit" ("CPU") will refer to a die, chip, package, or socket having multiple processing cores that share an LLC. Threads may be transferred from the one processor to the other and between cores of a single processor. The decision of which thread to transfer between processors should be made intelligently, based on expected behavior of the thread and its impact on microarchitectural resources, including the LLC of each processor.

SUMMARY

A plurality of threads may be scheduled in an intelligent manner that takes into consideration predicted detrimental impact caused by contention for the last level cache (LLC) shared by the threads. A first and second scenario having a corresponding first and second combination of threads running on the processor are identified. Additional scenarios may be identified as well. The cache occupancies of each of the threads for each of the scenarios are predicted. The predicted cache occupancies are a representation of an amount of the LLC that each of the threads would occupy when running with the other threads on the processor according to the particular scenario. One of the scenarios is identified that results in the least objectionable impacts on all threads, the least objectionable impacts taking into account the impact resulting from the predicted cache occupancies. Finally, a scheduling decision is made according to the one of the scenarios that results in the least objectionable impacts.

DETAILED DESCRIPTION

Threads behave differently, requiring differing amounts of architectural resources, depending on the task they are performing and how they were programmed to complete that task. For example, U.S. patent application Ser. No. 12/251,108, filed Oct. 14, 2008 ("the '108 Application) describes how one can calculate a characteristic miss-rate curve (MRC) for each thread. The MRC represents expected cache miss rates (misses per cycle or unit of time) of a particular thread at different cache occupancies. In general, as cache occupancy increases, the miss-rate is reduced, but the relationship between cache occupancy and miss-rate can vary from one thread to another and between phases of execution of a single thread. That is, as the task being carried out by a particular thread changes or progresses, the miss-rate curve may change over time for that particular thread. Despite this dynamic behavior, historical behavior of a particular thread can be used (as described in the '108 application) to produce the MRC for that thread, which has predictive value as its cache occupancy varies.

It is also possible to generate miss ratio curves (as opposed to miss rate curves) which express misses per instruction. Miss ratio curves express miss rate in relation to cache occupancy in a manner that is not sensitive to variations in instructions per cycle caused by certain types of microarchitectural contention, such as memory interconnect congestion. A miss-rate curve (misses per cycle) can be converted to a miss ratio (misses per instruction) curve by multiplying each datapoint by the cycles per instruction at the corresponding cache occupancy. Since the number of cycles per instruction depends on, among other things, microarchitectural factors, the cycles per instruction can vary as a function of cache occupancy. The cycles per instruction value can be determined using hardware performance counters and the system clock. In one embodiment, a miss-rate curve is obtained from a miss ratio curve by considering "ideal" instructions per cycle at a point of least resource contention (i.e., by observing the value at full cache occupancy.) Discussion of the ideal instructions per cycle is provided in 12/550,193 filed Aug. 28, 2009 and entitled, "Thread Compensation for Microarchitectural Contention," ("the 193 Application"), incorporated herein by reference.

Another behavior characteristic of threads is referred to herein as "cache pressure," which is the tendency of a particular thread at a particular occupancy to increase its share of the LLC. Cache pressure may be expressed mathematically as:

$$P = (1 - O/N) \cdot M_O \quad \text{(Eq. 1)}$$

where for a particular thread, O is the current LLC occupancy expressed as a number of cache lines occupied, N is the total number of cache lines in the LLC, and $M_O$ is the miss-rate of the thread at the current occupancy O.

Calculating a thread's cache pressure requires the occupancy O and miss-rate $M_O$. These values may be calculated as described in the '108 Application and the 193 Application both of which are incorporated herein by reference.

In brief, occupancy of each thread is estimated according to Equation 2:

$$O' = O + (1 - O/N) \cdot \text{self} - O/N \cdot \text{other} \quad \text{(Eq. 2)}$$

where O' is an updated occupancy for a particular thread, O is the previous occupancy for that thread, N is the number of cache lines in the LLC, "self" is the number of misses caused by the particular thread, and "other" is the number of misses caused by other threads.

In Equation 2, the occupancy estimation assumes a random cache line replacement, rather than the more typical least recently used (LRU) cache line replacement scheme. It should be noted that there are a number of algorithms for LRU cache line replacement, but in general they tend to target for replacement cache lines that are the least recently accessed. Since different programs behave differently, the LRU cache line replacement scheme can impact relative cache occupancies to a significant degree in a scenario where two programs share an LLC and one of the two programs repeatedly accesses a current set of data that resides in the cache (i.e., high level of cache reuse) while the other program does not access the same data over and over, To adjust the estimated LLC occupancies, Equation 2 can be modified as:

$$O' = O \cdot (1 - \text{other} \cdot p1) + (N - O) \cdot \text{self} \cdot p2 \quad \text{(Eq. 3)}$$

where:

$$p1 = 1/[O + (r/R) \cdot (N - O)] \quad \text{(Eq. 4)}$$

and $$p2 = 1/[(R/r) \cdot O + (N - O)] \quad \text{(Eq. 5)}$$

in which:

$$r = (h + \text{self})/O \quad \text{(Eq. 6)}$$

and $$R = (H + \text{other})/(N - O) \quad \text{(Eq. 7)}$$

where h is the number of cache hits by the current thread since the previous occupancy calculation and H is the number of cache hits by other threads since the previous calculation. The values h and H can be determined using performance counters in the same manner that cache misses "self" and "other" are determined. The values r and R represent the intensity of cache reuse by the current and other threads, respectively. The value p1 denotes the probability that a miss falls on a line that belongs to the current thread, and p2 denotes the probability that a miss falls on a line that belongs to other threads. When there is random replacement, p2 is assumed to be the same as p1, which reduces Equation 3 to Equation 2. Equations 4-7 are designed to estimate p1 and p2 while taking into account effects of the LRU cache line replacement scheme.

While Equations 2 and 3 above represent different methods for estimating cache occupancy, other methods may be used that are consistent with the cache line replacement algorithm implemented by the processor. In addition, it should be understood that Equations 2 and 3 represent estimates of cache occupancy, not actual cache occupancies.

In one embodiment, the cache occupancy estimate for the currently-running thread on each core is updated every two milliseconds using Equation 2. A high-precision timer callback reads hardware performance counters to obtain the number of LLC cache misses for both the local core and the LLC as a whole since the last update. In addition to this periodic update, occupancy estimates may also be updated whenever a thread is rescheduled, based on the number of intervening cache misses since it last ran.

Using an MRC constructed from previous observations of thread execution, the miss rate for O' can be determined as M(O'). MRCs may be generated based on passive monitoring, wherein the miss rate observations are plotted as they occur. It is also possible to actively perturb the execution of co-running threads to alter their relative cache occupancies temporarily, to obtain a full MRC. Varying the group of co-running threads scheduled with a particular thread typically causes the particular thread to visit a wider range of occupancy points. In one embodiment, the execution of some cores may be dynamically throttled, allowing threads on other cores to increase their occupancies. This may be achieved in some processor architectures using duty-cycle modulation techniques to slow down specific cores dynamically. For example, processors available from Intel Corporation of Santa Clara, Calif. allow system code to specify a multiplier (in discrete units of 12.5%) specifying the fraction of regular cycles during which a core should be halted for the purpose of thermal management. When a core is slowed down, its co-runners (i.e., other cores on the same processor) have an opportunity to increase their occupancy of the LLC, while the occupancy of the thread running on the throttled core is decreased. To limit any potential performance impact, in one embodiment, duty cycle modulation is enabled during less than 2% of execution time, which results in only negligible performance impact caused by cache performance curve generation with duty-cycle modulation.

In one embodiment, occupancy is tracked by quantizing in discrete units equal to one-eighth of the total cache size, and discrete curves are constructed to bound the space and time complexity of curve generation, while providing sufficient accuracy to be useful in cache-aware CPU scheduling enhancements.

At equilibrium occupancies, the cache pressure exerted by co-running threads are either equal or zero. If the cache pressures are not equal, then the thread with the highest cache pressure increases its cache occupancy. When multiple threads share a cache, the occupancies tend to fluctuate around values at which their cache pressures are equal, i.e., the equilibrium cache pressure. That is, while at a particular occupancy, different threads may exhibit different cache pressures, whereas at the equilibrium occupancy, which varies from one thread to another, the cache pressures of co-running threads will be the same. The term, "equilibrium" should not be construed as necessarily being some quiescent balance between the individual threads. In tests, in most cases, co-running threads do not actually converge at such equilibrium occupancies, but instead cycle through a series of occupancies with oscillating cache pressures. However the fluctuations of the occupancies will be around values at which the cache pressures are equal.

Because different threads have different operating characteristics and therefore place differing demands or system resources, and in particular the LLC, it is helpful when making scheduling decisions, or to improve the overall performance of the system, to run a particular thread with a particular core in a manner that complements other threads running on the same processor that consequently share the same LLC.

Figure 1:
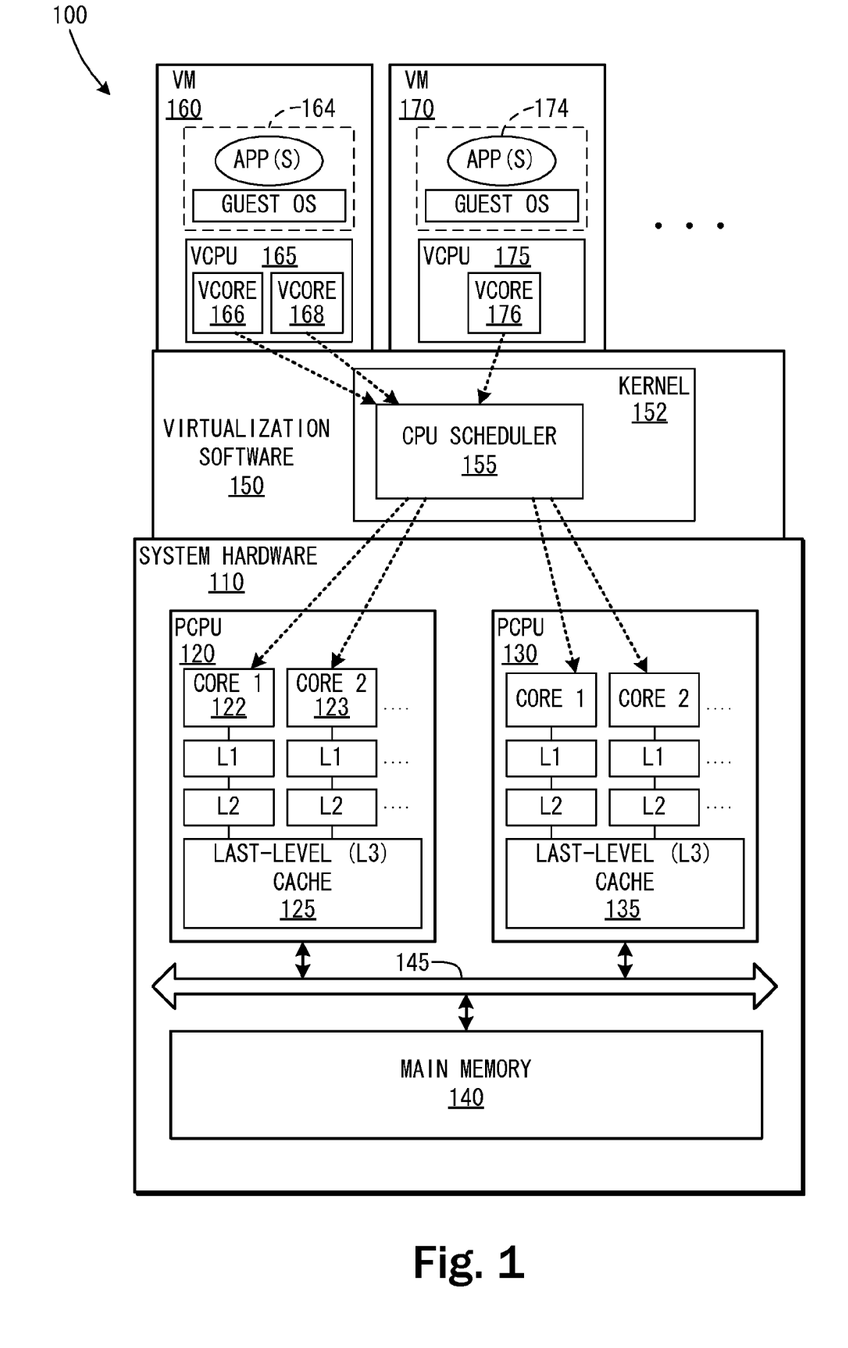
FIG. 1 shows a schematic block diagram of a virtualized computer system having a CPU scheduler.

FIG. 1 shows a virtualized computer system 100. Computer system 100 includes a hardware system 110 having one or more physical central processing units (PCPUs) 120, 130, each having a plurality of cores. PCPU 120 has a first core 122 and a second core 123, with several levels of cache, including a last-level cache (LLC) 125, which is shared between cores 122,123 of PCPU 120. Although the example system shown in FIG. 1 represents the LLC as being a level 3 (L3) cache, it should be noted that in some processor architectures, the L2 cache is the last level shared cache. PCPU 130 likewise has a plurality of processor cores and a shared LLC 135. PCPUs 120, 130, are connected to a main memory system 140 via a memory interconnect 145. Main memory 140 may comprise a system of memories, including volatile and nonvolatile memory, and can include uniform or non-uniform memory accesses (NUMA); the term "memory interconnect" referring to any communication paths for accessing memory.

System hardware 110 will include many components aside from those specifically mentioned here, and such omissions are for the purpose of not obscuring the most relevant elements of system 100 and should therefore not be construed as being limiting in any way. For example, PCPUs 120, 130, main memory 140, and memory interconnect 145, may be just one node in a system with additional nodes (not shown) forming a non-uniform memory access (NUMA) based architecture. NUMA architecture is well known in the field of computer science. In such systems, a plurality of nodes each having one or more processors, local memory, and local input/output channels, are connected together so that they can read each other's memory and update each other's cache to ensure cache-coherency. NUMA architecture is referred to as "non-uniform" because it takes less time for an intra-node memory access (i.e., a processor accessing local memory) than it takes for an inter-node memory access (i.e., a processor accessing a remote memory).

In the example presented by system 100, virtualization software 150 is executing on system hardware 110, as shown conceptually in the diagram of FIG. 1. Of course, virtualization software 150 may reside in main memory 140 and be executed by one or both PCPUs 120, 130, but is shown conceptually in FIG. 1 as running "on top of" system hardware 110. Virtualization software 150 may comprise a plurality of software layers including a kernel 152, which manages the hardware resources of system hardware 110, and an instance of a virtual machine monitor (VMM, not shown) for each virtual machine (VM), which emulates hardware resources for the virtual machines. Kernel 152 includes CPU scheduler 155 for prioritizing and dispatching execution threads to cores 122, 123, etc. Virtualization software 150 enables execution of a plurality of virtual machines 160, 170, etc., in a well-understood manner.

Each virtual machine 160, 170 is an abstraction of a physical computer system, having virtual hardware including one or more virtual central processor units (VCPUs) 165, 175 each having one or more virtual cores ("VCORE") 166, 168, 176, etc. In addition, each VM includes guest system software 164, 174, which includes a guest operating system and any number of applications. The guest operating system (OS) may be a commodity operating system such as Windows®, Linux®, etc., or a specialized "para-virtualized") operating system. In either case, the guest operating system includes a kernel (not shown) that, among other tasks, assigns processes, such as ones associated with the guest applications, to the virtual cores of VCPUs that are conceptually part of that virtual machine but are implemented by virtualization software 150. Instructions executing on virtual cores 166, 168, 176 may in fact be directly executed on PCPUs 120, 130, but under the direction and control of virtualization software 150. It is possible to present the VCPU topology to the guest OS with any number of virtual cores per VCPU. Thus, it is possible to present the two virtual cores in VM 165 as separate VCPUs rather than as a single VCPU having two cores. It should also be noted that although VM 160 has only on VCPU with two cores, any number of VCPUs each having any number of virtual cores may be presented. In one embodiment, the VMMs (not shown) include a thread mapped to each virtual core in the corresponding virtual machine, which is assigned by CPU scheduler 155 to one of the cores of PCPUs 120, 130.

In addition to the VMM threads, the CPU scheduler assigns threads corresponding to kernel 152 itself, so that kernel 152 can carry out its own tasks. CPU scheduler 155 distributes hardware resources, including PCPU time to each thread corresponding to each virtual core, and to any threads running within virtualization software 150.

Figure 2:
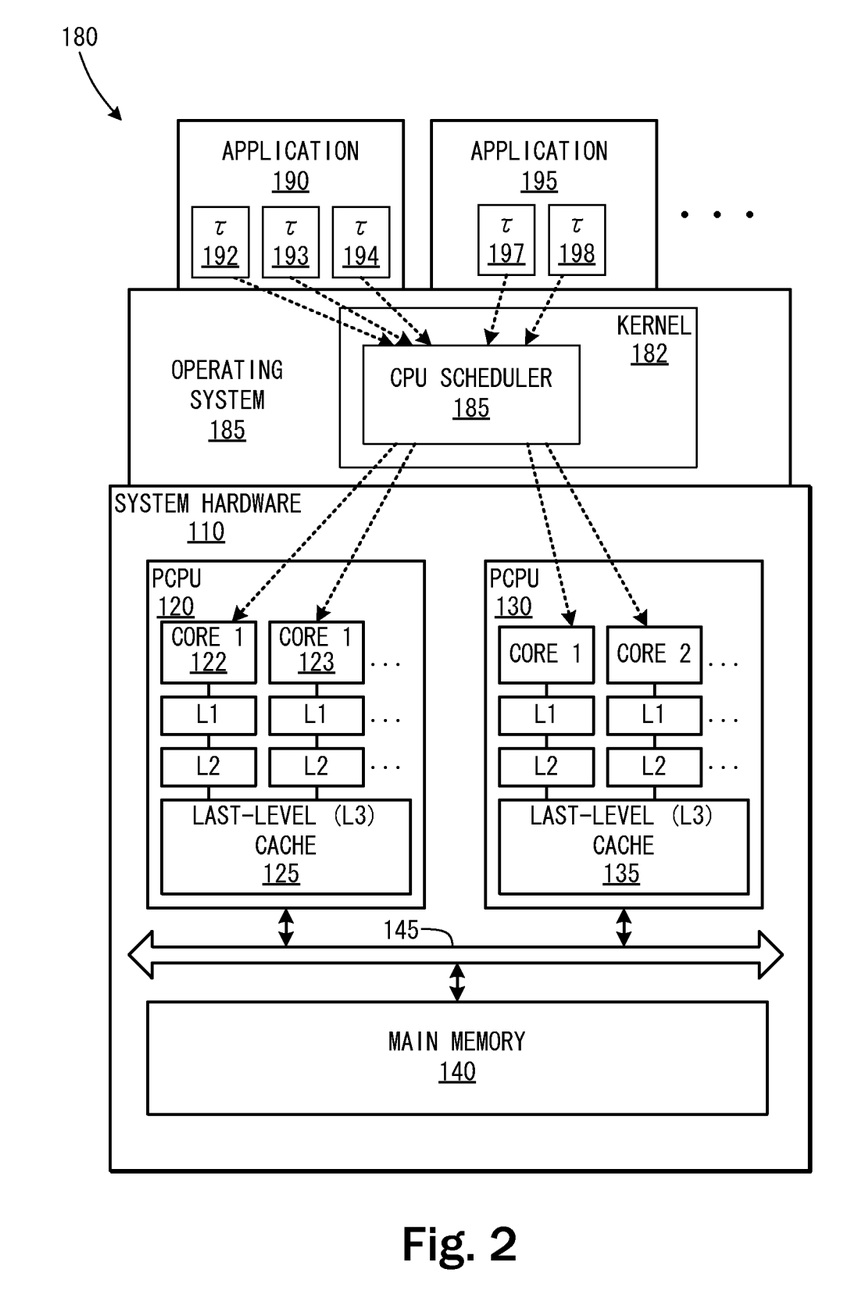
FIG. 2 shows a schematic block diagram of a computer system having a traditional operating system with a CPU scheduler.

FIG. 2 shows a system 180 having system hardware 110 as described above with reference to FIG. 1, but with traditional operating system 185 executing thereon as shown conceptually in FIG. 2 by positioning operating system 185 on system hardware 110. Operating system 185 includes a kernel 182 for managing physical system hardware 110, and other components and modules (not shown) providing an execution environment, as generally known in the field of operating system development, for executing applications 190, 195, etc. Each application 190, 195 can have one or more threads 192, 193, 194, 197, 198, etc., that are assigned by CPU scheduler 185 to one or more cores 122, 123, etc., of system hardware 110.

In one embodiment, CPU scheduler 155 (FIG. 1) or 185 (FIG. 2) manages PCPU cycles according to a generalized processor sharing (GPS) model. With GPS, each thread appears to execute on its own dedicated processor at a rate proportional to a value given by the thread's assigned weight divided by the sum of all the weights of all the threads. Thus, the greater the assigned weight for the thread relative to weights of other threads, the faster it executes relative to other threads in the system. This is considered a "proportional fair" system since the hardware resource is fairly distributed proportionally to the assigned weights. The CPU scheduler then determines which thread should be scheduled next based on which has not had its fair share of the processor resources based on its assigned weight.

Threads may execute until blocked or preemptively descheduled by CPU scheduler 155, 185. Threads may block, e.g., when an input/output or event request is issued and execution cannot continue until the needed data is retrieved or some other event needs to complete. In virtualized computer systems such as that described above with reference to FIG. 1, the CPU scheduler 155 may deschedule a thread corresponding to a virtual core if it detects that the guest OS managing the virtual core is in an idle loop. By way of example, U.S. patent application Ser. No. 10/871,922, filed Jun. 18, 2004 and incorporated herein by reference, presents an embodiment for idle loop detection in guest operating systems.

The weight is an arbitrary number assigned to each thread. In one embodiment, the number is taken or derived from values given to processes, applications, virtual machines, or other software execution entities or abstractions, by an administrator or user of the computer system. For example, an administrator may decide that VM 160 (FIG. 1) is more important than VM 170, and should therefore be given three times the resources of VM 170. The administrator/user may therefore assign a weight of 120 to VM 160 and a weight of 40 to VM 170, or any pair of numbers having a 3:1 ratio. In one embodiment, the weight of 120 assigned to VM 160 is divided evenly among each virtual cores 166, 168, so that each of the two virtual cores in VM 160 inherits half of the assigned weight of 120, i.e., a weight of 60. The virtualization software then takes the two threads created by the VMM (not shown) for VM 160, one thread for each virtual core, and assigns PCPU time according to the weight of 60. VM 170, having a single virtual core and an assigned weight of 40, will have a thread corresponding to virtual core 176 with a weight of 40. CPU scheduler 155 therefore assigns threads for virtual cores 166, 168, and 176 to available PCPU cores according to the ratio 60:60:40, respectively.

In another embodiment, a weight or resource share is assigned to each VM without dividing the resource between the VM's virtual cores in a predetermined manner. In this embodiment, the consumption of PCPU execution time consumed by each VM is tracked as a total of its constituent VCPU resource consumption. Therefore, if one of the virtual cores idles in the VM, the share of PCPU resources allocated to that VM flows to the running virtual cores.

In practice, GPS can only be approximated as there are typically fewer processing cores than threads, and each core is time shared at some discrete granularity of time (e.g., several milliseconds). The principles of the GPS model are well known in the art of computer resource scheduling.

Common to many "proportional fair," e.g., "weighted fair queuing" (WFQ) scheduling algorithms is the notion of virtual time. A thread's virtual time increases in proportion to real time based on (i.e., as a function of) the weight assigned the particular thread such that:

$$v' = v + q/w \qquad \text{(Eq. 8)}$$

where v' is the updated virtual time for a particular thread at real time t, v is the current virtual time for that thread before being updated, q is the actual time spent by that thread using a resource, and w is the weight for that thread. The actual time spent by the thread may be determined by PCPU execution time since the last update to v(t) for the thread. By prioritizing clients with lower virtual times, e.g., by scheduling them first, proportional-fair schedulers favor clients with higher weights. More precisely, the threads' CPU usage ratios match (or approximate) their relative weights when the system is overcommitted, i.e., the threads are fully backlogged. The concept of virtual time is well known among programmers familiar with process scheduling in computer systems. However, reference is made to the '193 Application, which provides a more detailed discussion.

PCPU resources may be divided among threads, or any higher level abstraction, including processes, applications, virtual cores, VCPUs, virtual machines, users, and groups. Each thread or higher-level abstraction may be referred to as a "resource consumer" or "client." In one embodiment, resource shares are assigned to individual VMs running concurrently on a particular system. In this case, each VM has its virtual time stamp updated whenever any of its constituent virtual cores consumes PCPU time to execute guest code. Thus, when one virtual core idles in a guest VM, remaining virtual cores can consume the VM's full allocation of PCPU resources. Although the discussion following relates specifically to threads for clarity, it should be understood that the resource management algorithms described herein may be applied to any resource consumer at any level of abstraction.

Other proportional fair algorithms are known that do not rely on a notion of virtual time. One example is referred to as Lottery Scheduling, which is described by Carl A. Waldspurger and William E. Weihl in their paper entitled "Lottery Scheduling: Flexible Proportional-Share Resource Management" presented in the Proceedings of the First Symposium on Operating Systems Design and Implementation (OSDI '94) pages 1-11, Monterey, Calif., November 1994, which is incorporated herein by reference. In this approach, resource rights are represented by lottery tickets, and each allocation is determined by holding a lottery, in which the resource is granted to the client with the winning ticket, picked at random. The resource is therefore, in the aggregate, allocated among competing clients in proportion to the number of tickets that they hold.

The execution of a thread $\tau_1$ on one core of a given PCPU may interfere with data stored in the LLC for another thread $\tau_2$ executing on the same or another core of the same PCPU. That is, cache misses seen by $\tau_1$ result in memory accesses to populate the LLC with the necessary lines of data. Since the LLC is shared among all threads that execute on any of the PCPU's cores, cache misses by one thread may cause data stored by other threads to be evicted, which will result in further misses by the other threads sharing the same LLC. Therefore, if one thread is performing a memory-intensive task, it may unfairly utilize more than its fair share of the cache, causing other threads to spend an inordinate amount of time fetching data from the main memory that was evicted from the LLC by the thread performing the memory intensive task. This causes the progress of the other threads to suffer, sometimes to a great extent, at the expense of the one thread, since a significant amount of their time is spent performing time-consuming memory accesses, which only happen because of the one thread's memory-intensive activity.

The '193 Application describes a method for compensating one thread when its effective execution time is compromised by the greater cache pressure exerted by co-running threads. However, it may be useful to predict, based on previous behavior of a particular thread, how it will function with other threads running on a particular processor, so that scheduling decisions can be made that take into account the predicted behavior of the thread. That is, understanding, in advance of a scheduling decision, how the LLC will be divided among a plurality of co-running threads, can help make more intelligent scheduling decisions, as will be further described below.

Figure 3:
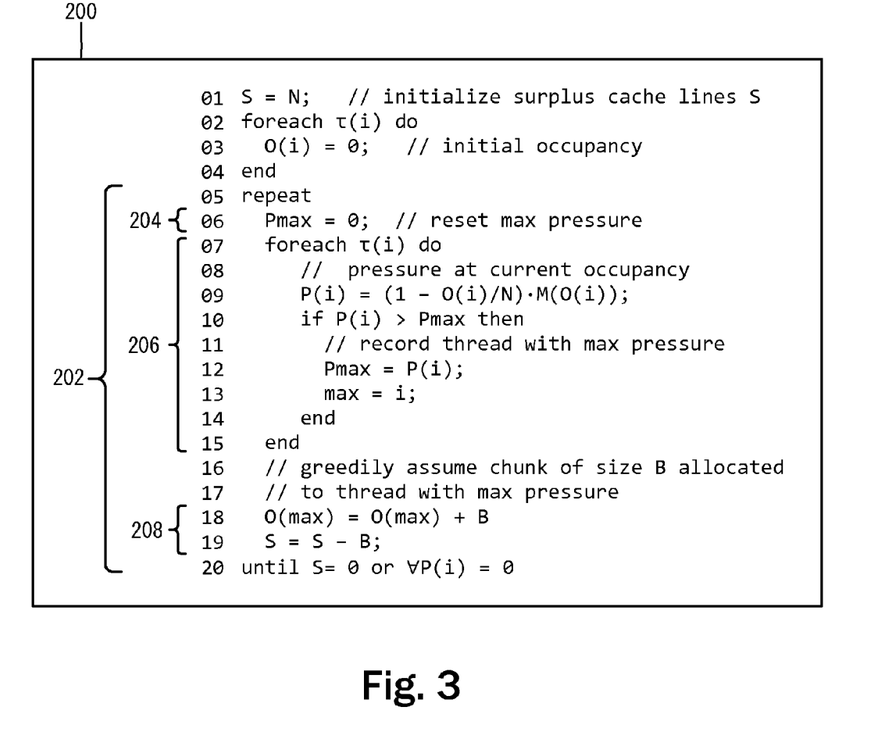
FIG. 3 shows pseudocode representing an algorithm that produces a predicted occupancy of a plurality of threads, given an initial occupancy, a miss rate curve for each thread, and a known size of the LLC.

FIG. 3 shows pseudocode 200 representing an algorithm that produces a predicted occupancy of a plurality of threads, given an initial occupancy, a miss rate curve for each thread, and a known size of the LLC. The algorithm presented in FIG. 3 is designed to predict, based on known miss-rate or miss-ratio curves of a plurality of threads, the equilibrium occupancy for the threads, should they be scheduled to share a common LLC. The algorithm is based on an assumption that for any plurality of threads sharing a cache, the thread having the highest cache pressure at a given time will increase its occupancy, up to a point where the competing pressure by all other clients prevents it from increasing its occupancy. This generates the fluctuations around the equilibrium cache pressure previously discussed.

The algorithm simulates running a plurality of threads $\tau$ until the cache of size N is full or the cache pressures are zero. Lines of pseudocode 200 that include double-slash characters "//" contain comments (that do not form part of the algorithm) after the double-slash. Lines 1-4 of the pseudocode presented in Table 1 initialize variable S to the number of cache lines N, which is a constant value, and the occupancy O(i) for each thread $\tau(i)$ to zero. The value i is used to identify a particular thread $\tau(i)$. That is, the value i can represent an index for the arrays P(i) and O(i), each of which for a particular value thread $\tau(i)$ return or contain the corresponding pressure or occupancy, respectively.

Once the variables are initialized in lines 1-4, Loop 202, including lines 5-20, repeats until S=0, i.e., the cache is full, or the pressures P(i) are zero for all threads $\tau(i)$, which is tested at line 20.

Loop 202 includes three sections: 204, 206, and 208. In section 204, the variable Pmax is initialized (set) to zero. Then, in section 206, which contains a do-loop, each cache pressure P(i) is calculated for each thread $\tau(i)$ using Equation 1, which was described above. If the cache pressure for any thread is greater than Pmax (tested in line 10) then Pmax is set to that cache pressure in line 12 and the thread identifier corresponding to the thread having the maximum cache pressure is stored in the variable "max" in line 13.

After calculating the cache pressure P for each thread $\tau$ and identifying the thread having the maximum cache pressure, loop 202, in section 208, then increases the presumed occupancy of the thread having the maximum cache pressure O(max) by an amount B in line 18 and subtracts B from the surplus (i.e., unassigned) cache S. Thus, in each execution of loop 202, a chunk of LLC is assigned to the thread having the highest cache pressure, and the amount of available cache space left is reduced by the same amount. As stated previously, loop 202 repeats until no cache is left (S=0) or the cache pressures are zero ($\forall P(i)=0$). The constant B is configurable, and serves to limit the number of iterations of the algorithm required to predict the equilibrium occupancies for the competing threads. In one embodiment, B is set to an amount equal one-eighth or one-sixteenth the total cache size N. During each iteration, the thread with the highest pressure increases its hypothetical cache occupancy. This in turn affects its current miss rate, and hence its current cache pressure. As the occupancy increases for a particular thread, its miss rate is reduced, and therefore the cache pressure diminishes. When the entire cache is divvied, or when all cache pressures reach zero, the algorithm terminates.

Figure 4:
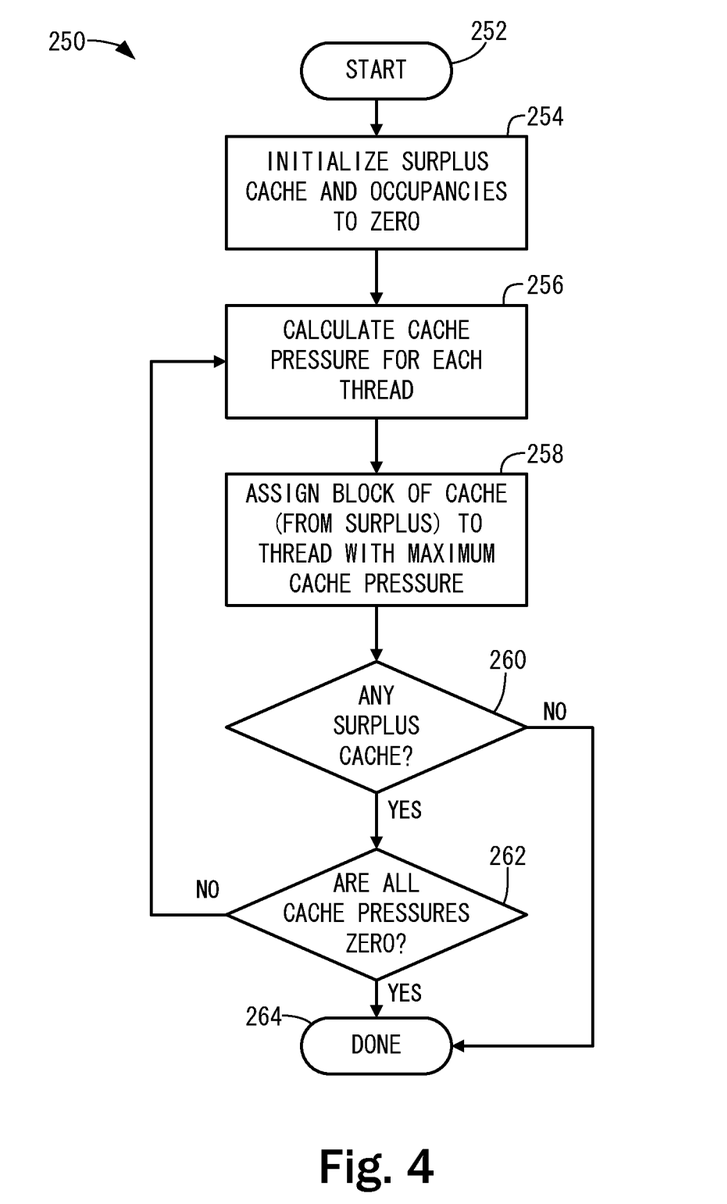
FIG. 4 shows a flowchart illustrating by way of example a procedure representing a more general view of the algorithm shown in FIG. 3.

FIG. 4 shows a flowchart 250 illustrating by way of example a procedure representing a more general view of the algorithm shown in FIG. 3. The procedure begins as indicated at start block 252 and flows to operation 254 wherein values for the surplus (i.e., unassigned) cache and cache occupancies are initialized to the LLC cache size and zero, respectively. Then the procedure flows to operation 256 wherein the cache pressure for each thread is calculated according to Equation 1. As noted previously, there is a relationship between cache pressure and occupancy such that as occupancy increases for a particular thread, cache pressure is reduced. Then, in operation 258, a block of the surplus cache is assigned to whichever thread has the highest cache pressure. That thread's occupancy is therefore increased and the surplus cache is decreased by the block amount. In example embodiments, the block amount B was set to one-eighth or one-sixteenth the cache size, as previously mentioned.

After the block from surplus cache is assigned in operation 258, the procedure flows to operation 260 to determine if there is any remaining surplus cache. If there is no remaining surplus cache, then the procedure ends as indicated by done block 264. However, if there is surplus cache remaining, then the procedure flows to operation 262, wherein it is determined whether the cache pressures are zero. If the cache pressures are zero then the procedure ends as indicated by done block 264, otherwise the procedure loops back to operation 256. After the algorithm terminates, a predicted equilibrium cache occupancy is known for each of the threads tested.

Figure 5:
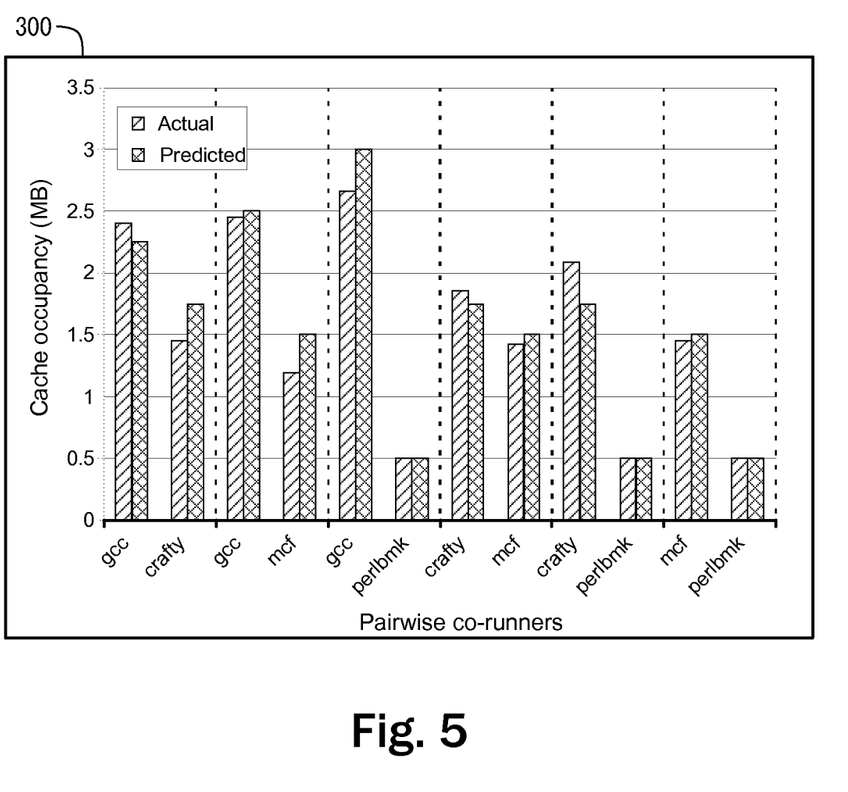
FIG. 5 shows a graph illustrating test data comparing predicted verses actual occupancies for a variety of thread pairings running on a dual core processor.

FIG. 5 shows a graph 300 illustrating test data comparing predicted verses actual occupancies for a variety of thread parings running on a dual core processor. In this experiment, the cache divvying algorithm described above with reference to FIGS. 3 and 4 was used to predict occupancies for six pairs of co-running threads, each pair shown in graph 300 separated from others by vertical dashed lines. In each case, the chunk size B was set to one-sixteenth of the cache size, which was 256 KB. Each co-runner generated 10 million interleaved cache references from a Valgrind trace. Valgrind is a well-known open source software tool for computer programmers that is publically available from the Valgrind Developers at Valgrind.org. A Valgrind trace precisely identifies what instructions are executed on a particular run of a program and can identify the state of the processor and other components such as the cache and memory at various points in execution. While 10 million cache references may be insufficient to lead to a full cache occupancy in all cases, results show that predicted occupancies are almost always within one chunk size of the actual cache occupancy, which is strongly suggestive that the cache divvying algorithm described herein is a valid method of predicting cache shares among co-running threads.

Once predictions of cache occupancies for co-running threads can be made, more intelligent decisions can be made when scheduling threads that share a common LLC. For a dual core processor, for example, selecting thread parings that result in the least amount of overall "conflict misses" can be made. Conflict misses are LLC misses that occur over a period of time in excess of the amount of misses that would occur at full cache occupancy, and can be simply determined using the known miss rate curve to determine the miss rate at full occupancy and subtract from that the miss rate at the occupancy predicted by the cache divvying algorithm.

Figure 6:
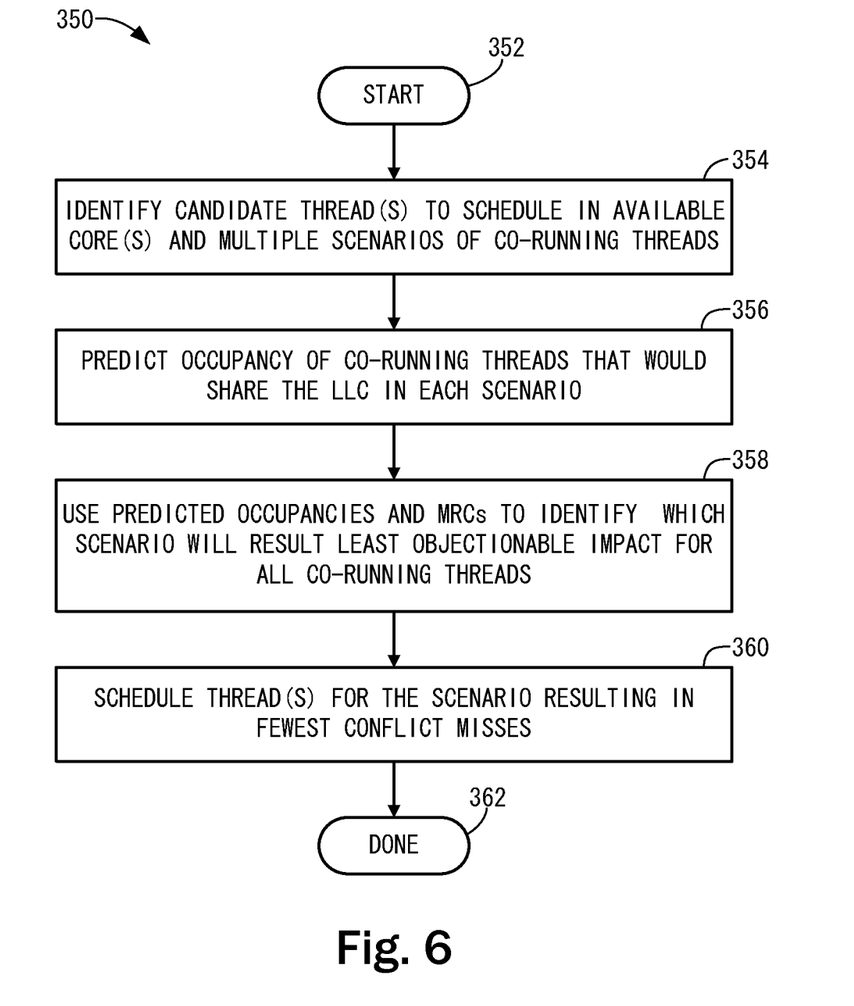
FIG. 6 shows a flowchart illustrating by way of example a procedure for pairing one or more threads to a particular core such that threads are scheduled based on predicted occupancies using the cache divvying algorithm previously described.

FIG. 6 illustrates a flowchart 350 illustrating by way of example a procedure for pairing one or more threads to a particular core such that threads are scheduled based on predicted occupancies using the cache divvying algorithm previously described. The procedure begins as indicated by start block 253 and proceeds to operation 354 wherein one or more candidate threads are identified for scheduling on a processor having a shared LLC. In one embodiment, the candidate threads may be the next two threads in a scheduling queue. That is the two threads that have had the least of their fair share of processor time based on their corresponding assigned weights. In another embodiment, candidate threads may be selected among threads executing in other processors to see if it makes sense to switch the thread to the current processor for improving performance by reducing overall cache pressure.

Once a candidate thread or threads are identified, the procedure flows to operation 356 wherein the cache divvying algorithm discussed above with reference to FIGS. 3 and 4 is used to predict the equilibrium occupancies of the candidate threads and any existing threads that would share the LLC according to the particular scenario being evaluated. For example, suppose two candidate threads are being tested to see which should be scheduled at an available core on a quad-core processor that currently has 3 running threads. There are two possible scenarios: either schedule one of the two candidate threads with the existing threads, or the other of the two candidate threads. The algorithm is run twice and the cache occupancies are predicted for all co-running threads in each scenario.

Then in operation 358, the predicted cache occupancies and miss-rate curves for each of the co-running threads in each of the scenarios are compared to identify which of the scenarios result in the fewest conflict LLC misses for all the co-running threads. This information may then be combined with other information, including but not limited to the amount of time a runnable thread has been queued waiting to be dispatched, relative importance of threads, etc., to evaluate which scenario results in the least objectionable impact on all co-running threads. For example, it may be considered less objectionable for a relatively unimportant thread to be greatly impacted by LLC contention than for a relatively important thread to be mildly impacted by LLC contention. In another example, it may be less objectionable to schedule a first thread that has been waiting a long time than a second thread that has been waiting a short time, even though the first thread will impact an important co-running thread to a greater degree than the second thread.

Finally, in operation 360, the candidate threads corresponding to the least objectionable scenario identified in operation 358 are scheduled that use the information in the available core. The procedure then ends as indicated by done block 362. This is an example of a method for making more intelligent scheduling decisions using the predicted cache occupancies from the cache divvying algorithm.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for scheduling a plurality of threads on a processor having a plurality of cores, the cores sharing a last level cache (LLC), the method comprising:
    identifying a first scenario having a first combination of threads running on the processor;
    identifying a second scenario having a second combination of threads running on the processor;
    predicting cache occupancies of each of the threads for each of the first and second scenarios, the predicted cache occupancies being a representation of an amount of the LLC that each of the threads would occupy when running with other threads on the processor according to the scenario;
    identifying which of the first and second scenarios results in least objectionable impacts on all threads, the least objectionable impacts taking into account the impact resulting from the predicted cache occupancies; and
    scheduling the threads according to the one of the scenarios that results in the least objectionable impacts,
    wherein the predicting of the cache occupancies comprises, for each of the first and second combination of threads, executing a cache divvying algorithm, the cache divvying algorithm including calculating cache pressure exerted by each of the threads in the combinations of threads, and assigning a block of unassigned cache to one of the threads that would exert a maximum cache pressure of all the threads at a currently assigned hypothetical cache occupancy, the hypothetical cache occupancy of the one thread being increased by an amount of the size of the block of the unassigned cache, the algorithm repeating the assigning until all the unassigned cache is depleted or all cache pressures of all threads of the combination of threads are zero, each of the threads having a predicted occupancy defined by the assigned hypothetical cache occupancy.

2. The method of claim 1, wherein the first scenario is a selection of a next thread in a thread scheduling queue to run with one or more currently running threads on the processor, and the second scenario is a selection of a subsequent thread in the thread scheduling queue to run with the one or more currently running threads on the processor.

3. The method of claim 1, wherein the identifying of which of the first and second scenarios results in the least objectionable impacts on all the running threads further takes into account relative importance of the threads of each of the combinations of threads.

4. The method of claim 1, further comprising, identifying a third scenario having a third combination of threads running on the processor, predicting the cache occupancies of each of the threads for the third scenario, and identifying which of the first, second, and third scenarios results in the least objectionable impacts on all threads.

5. The method of claim 1, wherein the predicting of the cache line occupancies comprises calculating data points for at least one of a miss rate curve or miss ratio curve for each of the threads, the data points being based on cache occupancy estimates that are based on observed LLC misses and/or hits by the threads.

6. The method of claim 5, wherein the cache occupancy estimates takes into account an implementation by the processor of a least recently used (LRU) cache line replacement scheme.

7. A method for scheduling a plurality of threads on a processor having a plurality of cores, the cores sharing a last level cache (LLC), the method comprising:
    identifying a first scenario having a first combination of threads running on the processor;
    identifying a second scenario having a second combination of threads running on the processor;
    predicting cache occupancies of each of the threads for each of the first and second scenarios, the predicted cache occupancies being a representation of an amount of the LLC that each of the threads would occupy when running with other threads on the processor according to the scenario;
    identifying which of the first and second scenarios results in least objectionable impacts on all threads, the least objectionable impacts taking into account the impact resulting from the predicted cache occupancies; and
    scheduling the threads according to the one of the scenarios that results in the least objectionable impacts,
    wherein the predicting of the cache occupancies comprises steps for divvying a hypothetical cache among the threads for each of the first and second combinations of threads using a cache divvying algorithm, the cache divvying algorithm including:
    initializing an amount of unassigned cache;
    initializing a hypothetical cache occupancy for each of the threads to zero; and
    assigning a block of the unassigned cache to one of the threads that would exert a maximum cache pressure of all the threads at a currently assigned hypothetical cache occupancy, the hypothetical cache occupancy of the one thread being increased by an amount of the size of the block of the unassigned cache; and
    repeating the assigning of the block of the unassigned cache for additional blocks of the unassigned cache until all the unassigned cache is depleted or all the threads have a cache pressure of zero.

8. A machine readable storage medium for scheduling a plurality of threads on a processor having a plurality of cores, the cores sharing a last level cache (LLC), the machine readable storage medium being non-transitory storage of computer instructions that cause a computer to implement a method, the method comprising:
    identifying a first scenario having a first combination of threads running on the processor;

identifying a second scenario having a second combination of threads running on the processor;

predicting cache occupancies of each of the threads for each of the first and second scenarios, the predicted cache occupancies being a representation of an amount of the LLC that each of the threads would occupy when running with other threads on the processor according to the scenario;

identifying which of the first and second scenarios results in least objectionable impacts on all threads, the least objectionable impacts taking into account the impact resulting from the predicted cache occupancies; and scheduling the threads according to the one of the scenarios that results in the least objectionable impacts, wherein the predicting of the cache occupancies comprises for each of the first and second combination of threads, executing a cache divvying algorithm, the cache divvying algorithm including calculating cache pressure exerted by each of the threads in the combinations of threads, and assigning a block of unassigned cache to one of the threads that would exert a maximum cache pressure of all the threads at a currently assigned hypothetical cache occupancy, the hypothetical cache occupancy of the one thread being increased by an amount of the size of the block of the unassigned cache, the algorithm repeating the assigning until all the unassigned cache is depleted or all cache pressures of all threads of the combination of threads are zero, each of the threads having a predicted occupancy defined by the assigned hypothetical cache occupancy.

9. The machine readable storage medium of claim 8, wherein the first scenario is a selection of a next thread in a thread scheduling queue to run with one or more currently running threads on the processor, and the second scenario is a selection of a subsequent thread in the thread scheduling queue to run with the one or more currently running threads on the processor.

10. The machine readable storage medium of claim 8, wherein the identifying of which of the first and second scenarios results in the least objectionable impacts on all the running threads further takes into account relative importance of the threads of each of the combinations of threads.

11. The machine readable storage medium of claim 8, further comprising, identifying a third scenario having a third combination of threads running on the processor, predicting the cache occupancies of each of the threads for the third scenario, and identifying which of the first, second, and third scenarios results in the least objectionable impacts on all threads.

12. The machine readable storage medium of claim 8, wherein the predicting of the cache line occupancies comprises calculating data points for at least one of a miss rate curve or miss ratio curve for each of the threads, the data points being based on cache occupancy estimates that are based on observed LLC misses and/or hits by the threads.

13. The machine readable storage medium of claim 12, wherein the cache occupancy estimates takes into account an implementation by the processor of a least recently used (LRU) cache line replacement scheme.

* * * * *